(12) United States Patent
Herrick et al.

(10) Patent No.: US 7,210,453 B2
(45) Date of Patent: May 1, 2007

(54) THROTTLE CONTROL METHOD AND APPARATUS

(75) Inventors: John Herrick, Aloha, OR (US); Fred Yates, Lebanon, OR (US); Jeffrey Scott Morgan, Portland, OR (US); Edward Ramsden, Hillsboro, OR (US)

(73) Assignee: Williams Control Industries Inc., Portland, OR (US)

( * ) Notice: Subject to any disclaimer, the term of this patent is extended or adjusted under 35 U.S.C. 154(b) by 0 days.

(21) Appl. No.: 11/373,045

(22) Filed: Mar. 9, 2006

(65) Prior Publication Data

US 2006/0201483 A1    Sep. 14, 2006

Related U.S. Application Data

(60) Provisional application No. 60/661,642, filed on Mar. 14, 2005.

(51) Int. Cl.
*F02D 9/10* (2006.01)

(52) U.S. Cl. ............... 123/399; 123/361; 73/117.3; 73/118.2

(58) Field of Classification Search ............ 123/361, 123/399; 73/117.3, 118.2
See application file for complete search history.

(56) References Cited

U.S. PATENT DOCUMENTS

| | | | | |
|---|---|---|---|---|
| 5,320,076 | A  * | 6/1994 | Reppich et al. | 123/399 |
| 2005/0183695 | A1* | 8/2005 | Keefover et al. | 123/399 |
| 2005/0224048 | A1* | 10/2005 | Hoshino et al. | 123/399 |
| 2006/0081218 | A1* | 4/2006 | Hino et al. | 123/399 |

* cited by examiner

*Primary Examiner*—Erick Solis
(74) *Attorney, Agent, or Firm*—Schwabe, Williamson & Wyatt, P.C.

(57) ABSTRACT

A throttle control device for transmitting signals to an electronic fuel control system for a vehicle engine is provided that includes an electromagnetic field generator and first and second electromagnetic field sensors positioned proximal to electromagnetic field. The electromagnetic field and the first and second sensors being manipulatable relative to each other, and the sensors being responsive to the relative manipulation. The sensors configured to independently transmit signals representative of said relative manipulation.

14 Claims, 3 Drawing Sheets

THROTTLE CONTROL METHOD AND APPARATUS

RELATED APPLICATIONS

This application claims priority based on U.S. Provisional Patent Application No. 60/661,642, filed Mar. 14, 2005, entitled "Non-Contacting Position Sensor with Electrically Independent Analog and Digital Outputs."

TECHNICAL FIELD

The present invention relates to controls for vehicles, such as throttle controls for vehicle engines where redundant control inputs may be needed or useful.

BACKGROUND

It is typical that an electronic throttle control for trucks include redundant control inputs. Examples are disclosed in commonly owned U.S. Pat. Nos. 5,321,980; 5,237,891; 5,133,225, and 4,976,166, the disclosures of which are incorporated herein by reference. The engine throttle is adapted to respond to a varying electronic input of one control sensor to generate an increasing/decreasing speed of the engine. The second input produces an "on/off" electronic signal and, for example, if in the "on" position indicates the idle position of the truck pedal and it will override the first signal as necessary to drop the engine speed back to idle. The reverse may also occur, i.e., where the varying signal indicates the idle position of the truck pedal and the "on/off" signal indicates that the pedal is depressed, in which case again the lower speed (e.g., idle) will be generated.

Traditionally, these sensors have relied on contacting switch and potentiometer based technology, which generally limits the operating lifetime and reliability. The common form of these sensors provides an output voltage that is proportional to the degree to which the throttle control is depressed (Analog Position Signal), and one or more switched outputs that are used to validate whether the throttle control is in an 'idle' state (Idle Validation Switch).

An object of the invention is to provide the safety features of the typical contact type throttle control signal generation but with non-contacting throttle control sensors, e.g., to achieve longer wear life without sacrificing throttle control reliability.

BRIEF DESCRIPTION OF EMBODIMENTS OF THE INVENTION

Embodiments of the present invention may utilize an electromagnetic field generator and two or more independent electromagnetic field sensors. The sensors and the electromagnetic field may be configured for movement relative to each other, where such movement may be caused by physical movement of a member, such as a driver's hand or foot actuation of a throttle pedal and/or lever.

Whereas the sensors may both read and/or sense the same relative movement of the magnetic field, they are electronically independent such that each conveys its own independent electric and/or electronic signal to the engine for throttle control, for example. In one embodiment, one sensor may generate a proportional analog output (e.g., variable) and the other a binary digital output (e.g., on/off). The proportional signal/output may dictate engine speed, unless the on/off output of the second sensor indicates the idle position such that the engine will decelerate to the idle position.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

In the following description and claims:

The phrase "in one embodiment" may be used repeatedly. The phrase generally does not refer to the same embodiment; however, it may. The terms "comprising," "having," and "including" are synonymous, unless the context dictates otherwise.

The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)." The phrase "(A) B" means "(B) or (A B)," that is, A is optional.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact.

However, "coupled" may also mean that two or more elements are not in direct contact with each other, but yet still cooperate or interact with each other.

Figure 1:
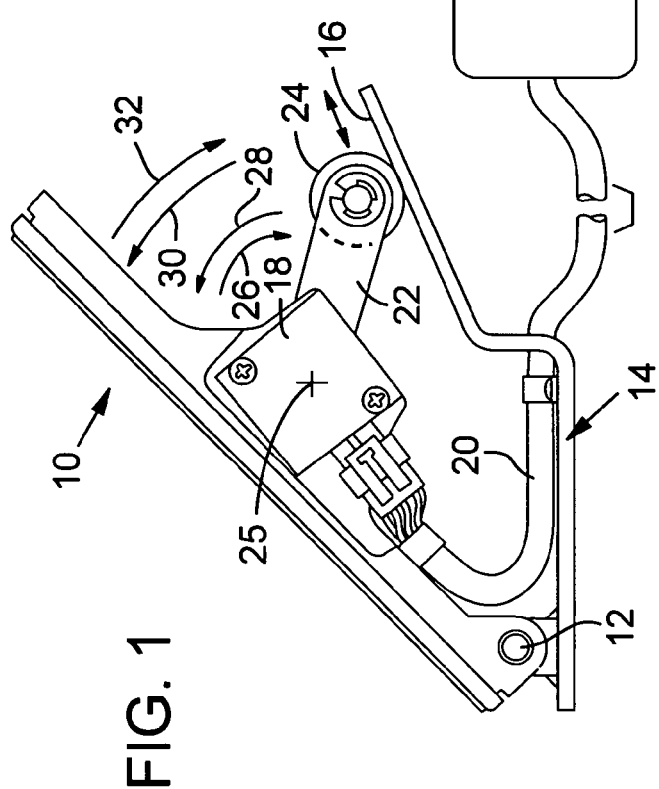
FIG. 1 is a side view of a foot pedal designed to convey desired speed signals to a truck engine as maybe adapted to the present invention.

FIG. 1 illustrates an example of a foot pedal 10 as may be mounted in the cab of a truck or other piece of heavy equipment. The pedal 10 may pivot about pivot point 12, which is secured to a mounting bracket 14. Forming part of the pedal 10 is a housing 18 containing components configured to create throttle control outputs, as will be explained hereafter. An arm 22 may project from the housing 18, such that a roller 24 may move linearly up and down a ramp 16 of bracket 14. Actuation of the pedal 10 in the direction indicated by arrows 30, 32 may cause pivotal movement of the arm 22 e.g. about a pivot 25 as indicated by arrows 26, 28.

The components of housing 18 may be configured to detect the position of the pedal 10, and communicate such position via signals sent to the vehicle's electronic fuel control system on wiring 20.

Figure 2:
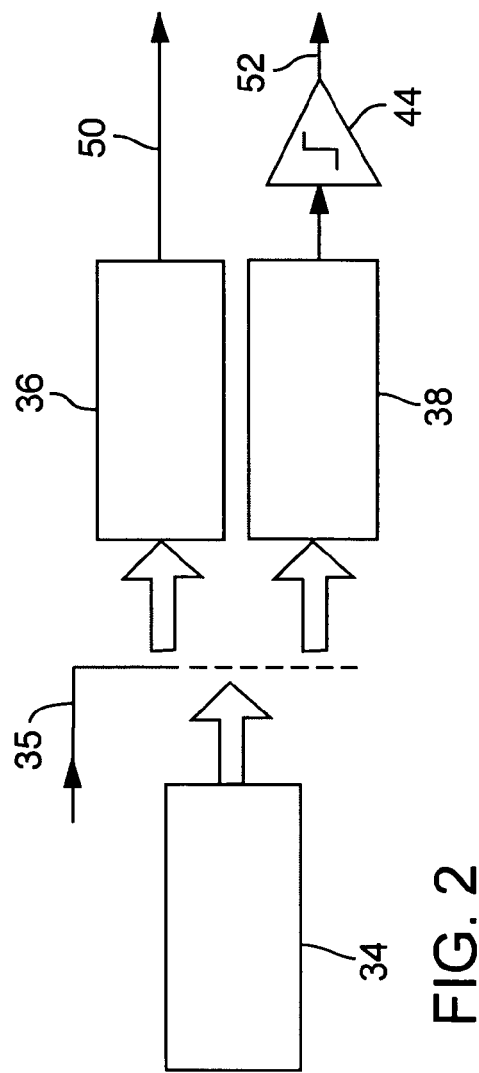
FIG. 2 is a schematic view illustrating the operation of a throttle in accordance with the present invention.

FIG. 2 illustrates a schematic view of a throttle control device in accordance with embodiments of the present invention, the components of which may include:

1) an electromagnetic field generator 34;
2) a detector/sensor 36 adapted to detect and/or sense the electromagnetic field and provide a proportional analog output signal 50;
3) a second detector/sensor 38 that is independent of the first sensor 36 and is adapted to detect and/or sense the electromagnetic field, compare the measurement to a predetermined threshold in a threshold detector 44, and provide a binary on/off output signal 52; and
4) a manipulation member 35 adapted to manipulate the electromagnetic field with respect to the sensors 36 and 38.

In various embodiments, the sensors may be positioned proximal to the electromagnetic field generator, and thus the electromagnetic filed, such that modifying, manipulating, and/or altering the coupling between the electromagnetic field generator. As used, "proximal" means positioned, in, adjacent, next to, near and/or within a detectable range. The field detectors/sensors may thus generally be a function of the physical position (linear, rotational, and/or otherwise) of a member via, for example, a mechanical linkage, which may be further appreciated from the following. In one embodiment, the second sensor may be adapted to directly output a binary and/or digital output.

Embodiments of the present invention may include two electrically independent and isolated sensors that are configured to relative movement of a magnetic field and generate independent outputs based thereon. Accordingly, a fault occurring in either sensor may often result in an output condition that can be identified as a fault. Further, a fault in one sensor's electrical circuit generally cannot cascade and cause a fault in the other sensor's circuitry.

Figure 3:
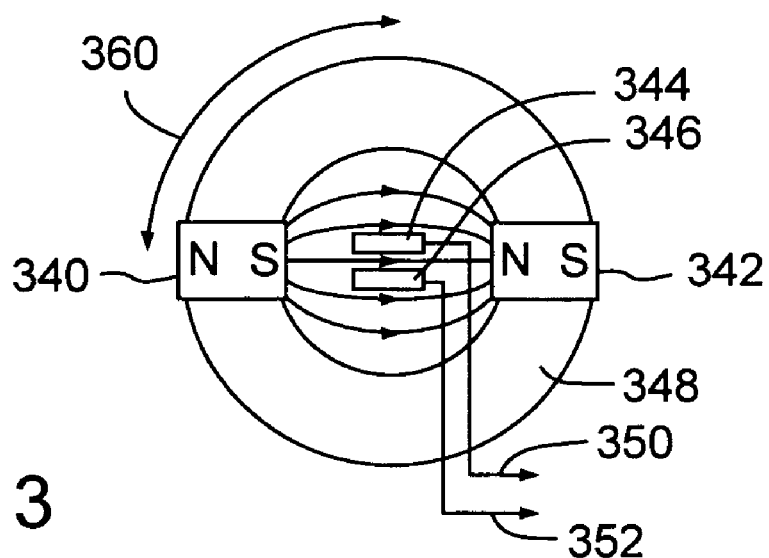
FIG. 3 is a schematic view of a throttle control in accordance with an embodiment of the invention.

In various embodiments, the electromagnetic field generator may be a magnetic based generator. FIG. 3 illustrates one such example. The electromagnetic field generator may include one or more magnets 340, 342 carried by a yoke 348. Yoke 348 may be configured to rotate based on an external input as illustrated by arrow 360, for example, an operator pushing on a throttle pedal. Yoke 348 may be further configured to rotate around two magnetic field detectors 344, 346, which may be sensitive to fields oriented in one axis, for example. Because of the detectors' orientation sensitivity, the rotating of the yoke 348 serves as a way of varying the coupling between the field generator and the detectors 344, 346. Sensors 344 and 346 may be adapted to generate a respective analog output signal 350 and a digital output signal 352.

In one embodiment, a flux concentrator may be used in order to enhance the magnetic fields generated by the electromagnetic field generator. In various embodiments, magnetic field detectors may use both Hall-effect and/or magneto resistive technologies. The magnetic field detectors may also be configured to provide either proportional linear output signals and/or binary digital output signals, which may turn on and off at prespecified levels of magnetic field. In the illustrated embodiment, one detector 344 may provide an analog output signal 350, while the other detector 346 provides the binary digital output signal 352, both of which may be sent to the engine for throttle control.

Figure 4:
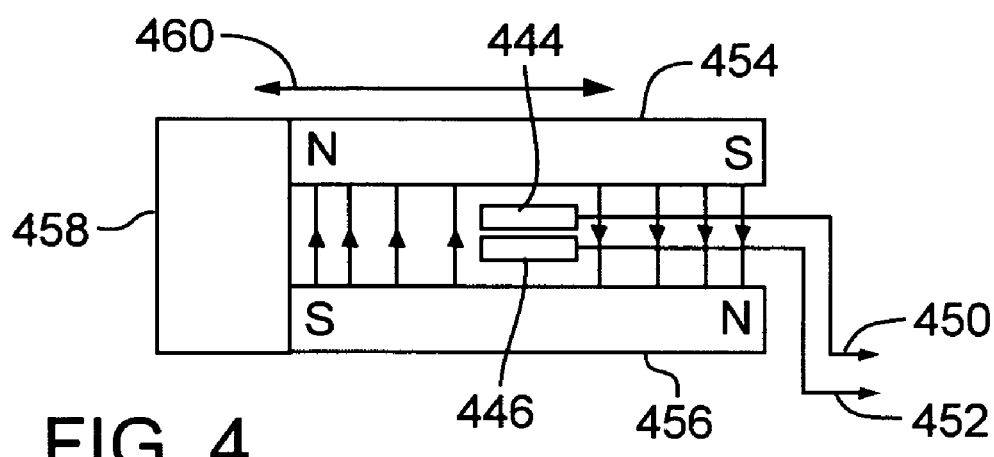
FIGS. 4 through 7 illustrate various throttle control arrangements in accordance with embodiments of the invention.

Embodiments of the present invention are not limited to rotary magnetic based position sensors, but may include other magnetic based sensors. FIG. 4 shows a related embodiment in which linear position may be detected. As in the previous example, both an analog output sensor 444 and a digital binary output sensor 446 may be used. Magnets 454, 456 may be coupled to yoke 458 and accordingly moved linearly (indicated by arrow 460) with respect to the sensors 444 and 446, to thereby detect a change in the magnetic field. In one embodiment, detector 444 may provide an analog output signal 450, while the other detector 446 provides the binary digital output signal 452, both of which may be sent to the engine for throttle control.

Figure 5:
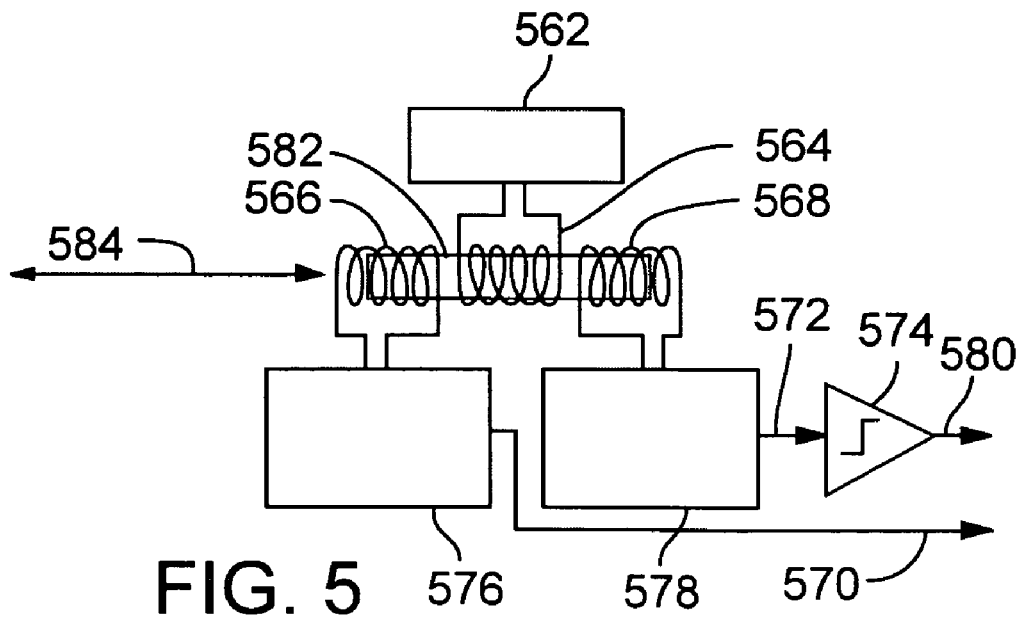

In various embodiments, induction based electromagnetic field generators may be used. FIG. 5 illustrates one such example, where the electromagnetic field generator includes an oscillator 562 that produces a time-varying voltage signal, which is communicated to a generating coil 564, such that a time-varying magnetic field may be generated. The magnetic field detectors may include sensing coils 566, 568, which are placed in proximity to the generating coil 564. Corresponding signal detectors 576, 578 may be used to convert the time-varying signal provided by each respective sensing coil 566, 568 into continuous output signals 570, 572. One output signal 570 may provide analog output signal, and the other output signal 572 may then be compared to a predetermined threshold using, for example, a threshold detector 574, which may be configured to generate a binary digital output 580.

In one embodiment, a movable ferrite rod 582 may be used to vary the magnetic coupling between the generating coil 564 and the sensing coils 566, 568. When the rod 582 is moved towards one sensing coil, for example, more of the generated magnetic field will be directed toward that coil. Accordingly, rod 582 may be moved at least linearly as shown by arrow 584.

Figure 6:
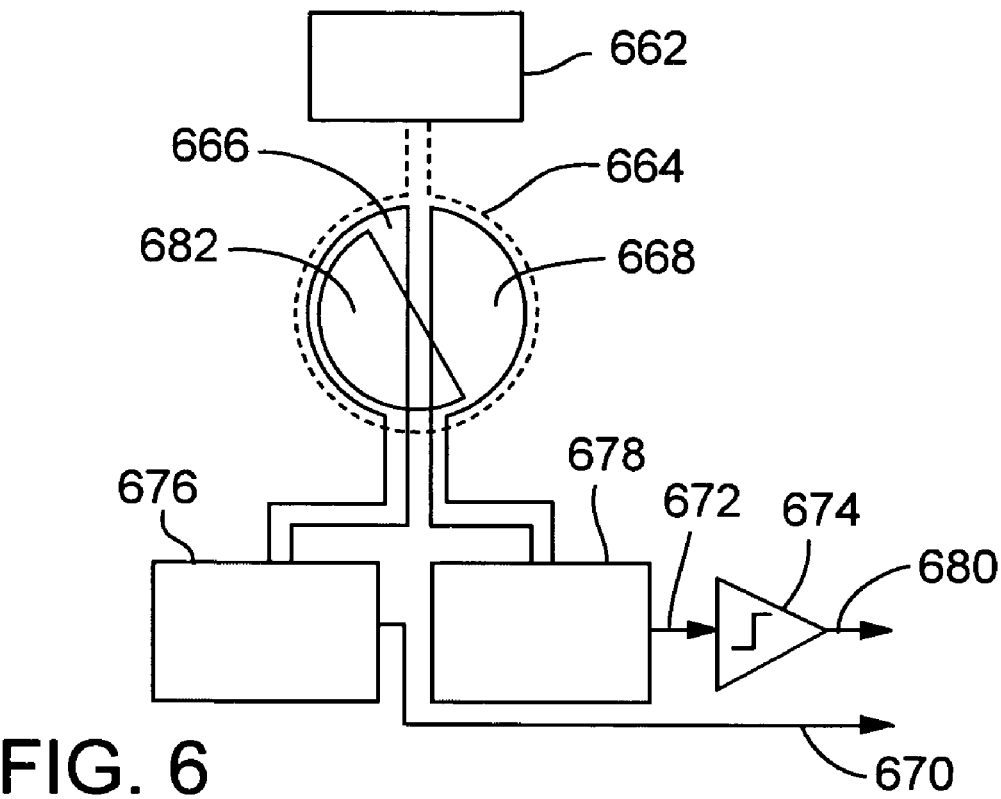

FIG. 6 illustrates an induction based throttle control where a conductive member rotates to move relative to the sensing coils to manipulate the magnetic field generated relative to the sensing coils. An oscillator 662 produces a time-varying voltage signal that is communicated to a generating coil 664. A conductive member 682 may be interposed between the generating coil 664 and a pair sensing coils 666 and 668. In this example, a conductive member 682 is adapted to rotate and manipulate (e.g., absorb) the magnetic field, thereby selectively shielding the sensing coils 666 and 668 as a function of its rotation.

As with the embodiment illustrated with FIG. 5, corresponding signal detectors 676, 678 may be used to convert the signal provided by each respective sensing coil 666, 668 into continuous output signals 670, 672. One output signal 670 may provide analog output signal, and the other output signal 672 may then be compared to a predetermined threshold using, for example, a threshold detector 674, which may be configured to generate a binary digital output 680.

Figure 7:
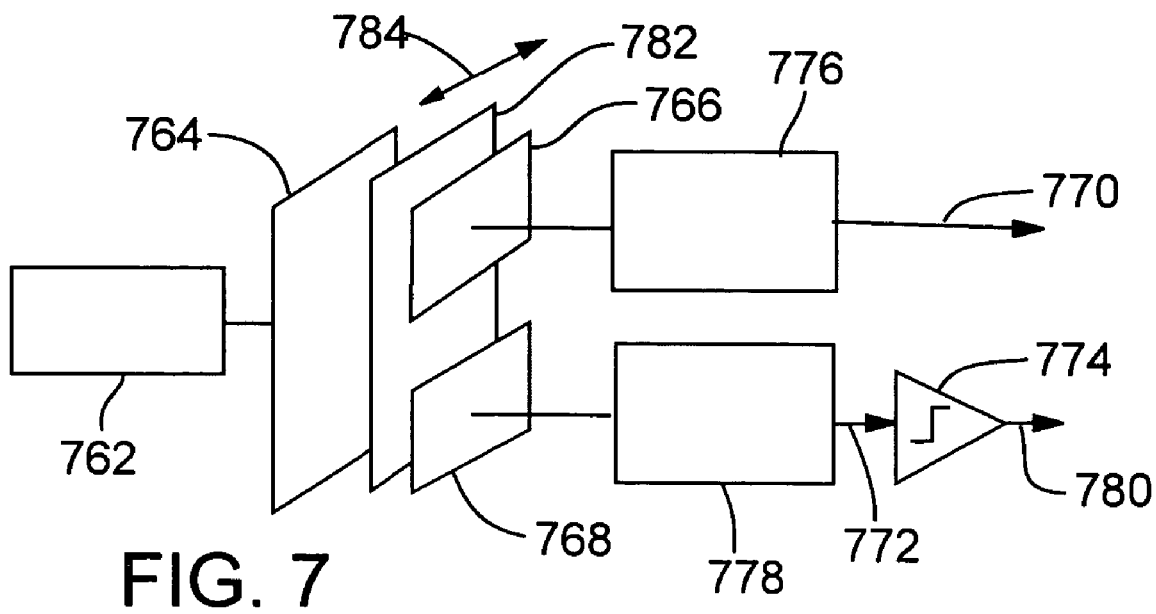

In various embodiments, capacitive based magnetic field generators may be used to generate control signals. FIG. 7 illustrates one such example, where the electromagnetic field generator includes an oscillator 762 coupled to a field generating plate and/or coil 764. An interrupter plate 782, which may be grounded, is interposed between the field generating plate 764 and two sensing plates 766 and 768. As the interrupter plate 782 is moved (as illustrated by arrow 784), it provides a variable coupling between the generating plate 764 and sensing plates 766 and 768. Again, corresponding signal detectors 776, 778 may be used to convert the signal provided by each respective sensing plate 766, 768 into continuous output signals 770, 772. One output signal 770 may provide analog output signal, and the other output signal 772 may then be compared to a predetermined threshold using, for example, a threshold detector 774, which may be configured to generate a binary digital output 780. While in the various described embodiments the electromagnetic field is being manipulated (e.g., movement of the magnets and/or movement of an interrupting member) relative to the sensors, in various other embodiments, the sensors may be configured to be manipulated (e.g., by moment and/or interrupting) relative to the electromagnetic field generator to modify the magnitude of the magnetic field sensed by the sensors.

Further, while the illustrated embodiments have been described with respect to a throttle control on a vehicle, vehicle is intended to apply broadly to moving machines such as cars, trucks, heavy equipment, aircraft, watercraft, trains, and the like. Further, the control system of the present invention may also apply to various vehicle controls, including, but not limited to throttle controls, power takeoff controls, and the like.

Although certain embodiments have been illustrated and described herein for purposes of description of preferred embodiments, it will be appreciated by those of ordinary skill in the art that a wide variety of alternate and/or equivalent embodiments or implementations calculated to achieve the same purposes may be substituted for the embodiments shown and described. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A control device for generating and transmitting signals to a vehicle control system comprising:
    an electromagnetic field generator configured to generate an electromagnetic field;
    a first sensor and second sensor positioned proximal to the electromagnetic field generator;
    a control member configured to cause manipulation of the electromagnetic field relative to the first and second sensors; and
    wherein the first sensor is configured to detect the manipulation of the electromagnetic field and generate an analog output, and wherein the second sensor is configured to detect the manipulation of the electromagnetic field and independently generate a binary output.

2. A control device as defined in claim 1, wherein the control member is a foot pedal to be manipulated by a foot of a vehicle driver.

3. A control device as defined in claim 1, wherein the control member is a hand lever to be manipulated by a vehicle driver.

4. A control device as defined in claim 1, wherein the manipulation of the electromagnetic field includes moving the first and second sensors relative to the electromagnetic field generator.

5. A control device as defined in claim 1, wherein the manipulation of the electromagnetic field includes moving the electromagnetic field generator relative to the first and second sensors.

6. A control device as defined in claim 1, wherein the first and second sensors are generally stationary and the electromagnetic field is moved relative to the sensors.

7. A control device as defined in claim 6, wherein the generator includes a rotatable circular yoke having opposing magnets generating an electromagnetic field across a center opening of the yoke, said sensors fixedly mounted in said opening whereby rotative movement of the yoke changes the electromagnetic field relative to the sensors.

8. A control device as defined in claim 6, wherein the generator includes a linearly movable yoke carrying elongate spaced apart magnets, said sensors fixedly mounted at a position between said magnets whereby linear movement of the magnets changes the electromagnetic field relative to the sensors.

9. A control device as defined in claim 6, wherein the generator is an oscillator-coil electromagnetic field generator, and said sensors comprise sensing coils, and a conductive member movable relative to the coils for changing the electromagnetic field relative to the sensing coils.

10. A control device as defined in claim 6, wherein the generator is an oscillator-coil field generator generating, and wherein the sensors include sensing coils, and further including a rotating conductive member within the electromagnetic field that is configured to vary the effect of the electromagnetic field relative to the sensing coils by its rotational movement.

11. A control device as defined by claim 6, wherein the generator generates an electromagnetic field and having sensing plates positioned within the field, and a movable plate movably disposed between the generator and sensing plates to variably shield the sensing plates to manipulate electromagnetic field sensed by the sensing plates.

12. A control device as defined in claim 1, wherein the second sensor is configured to output an analog signal, and wherein the control device further includes a comparator adapted to receive the second sensor analog signal and generate the binary output.

13. A vehicle throttle control device, comprising:
    an electromagnetic field generator configured to generate an electromagnetic field;
    a first sensor adapted to detect the electromagnetic field and provide a proportional first analog output signal;
    a second sensor that is independent of the first sensor, the second sensor configured to sense the electromagnetic field, generate a second analog output signal, compare the second analog output signal to a predetermined threshold, and provide a binary on/off output signal; and
    a control member adapted to manipulate the electromagnetic field with respect to the first and second sensors.

14. The vehicle throttle control device of claim 13, further comprising a comparator adapted to compare the second analog output signal to the predetermined threshold, and based on the comparison generate the binary on/off output signal.

* * * * *